US006978360B2

(12) United States Patent
Bilardi et al.

(10) Patent No.: US 6,978,360 B2
(45) Date of Patent: Dec. 20, 2005

(54) SCALABLE PROCESSOR

(75) Inventors: Gianfranco Bilardi, Padua (IT); Kattamuri Ekanadham, Mohegan Lake, NY (US); Pratap Chandra Pattnaik, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 603 days.

(21) Appl. No.: 09/854,243

(22) Filed: May 11, 2001

(65) Prior Publication Data

US 2002/0169947 A1 Nov. 14, 2002

(51) Int. Cl.⁷ ............................................. G06F 9/312
(52) U.S. Cl. ...................... 712/225; 712/219
(58) Field of Search ................. 712/219, 225

(56) References Cited

U.S. PATENT DOCUMENTS

| | | | |
|---|---|---|---|
| 6,006,325 A * | 12/1999 | Burger et al. ............... 712/214 |
| 6,092,158 A * | 7/2000 | Harriman et al. ........... 711/151 |
| 6,647,489 B1 * | 11/2003 | Col et al. .................... 712/226 |
| 6,671,747 B1 * | 12/2003 | Benkual et al. ................ 710/1 |

* cited by examiner

Primary Examiner—Eric Coleman
(74) Attorney, Agent, or Firm—Anne Vachon Dougherty; Douglas W. Cameron

(57) ABSTRACT

A method and apparatus for issuing and executing memory instructions from a computer system so as to (1) maximize the number of requests issued to a highly pipe-lined memory, the only limitation being data dependencies in the program and (2) avoid reading data from memory before a corresponding write to memory. The memory instructions are organized to read and write into memory, by using explicit move instructions, thereby avoiding any data storage limitations in the processor. The memory requests are organized to carry complete information, so that they can be processed independently when memory returns the requested data. The memory is divided into a number of regions, each of which is associated with a fence counter. The fence counter for a memory region is incremented each time a memory instruction that is targeted to the memory region is issued and decremented each time there is a write to the memory region. After a fence instruction is issued, no further memory instructions are issued if the counter for the memory region specified in the fence instruction is above a threshold. When a sufficient number of the outstanding issued instructions are executed, the counter will be decremented below the threshold and further memory instructions are then issued.

10 Claims, 6 Drawing Sheets

INVARIANT:
$(X_i = 3) \Rightarrow$ INCOMING LINKS HAVE
AT MOST ONE RESPONSE

US 6,978,360 B2

SCALABLE PROCESSOR

DESCRIPTION

TECHNICAL FIELD

This invention related to a method and apparatus for issuing and executing instructions in a computer system.

BACKGROUND OF THE INVENTION

A significant portion of the complexity of current processors can be attributed to their attempts to mask the latency of memory accesses. Multi-threading, out of order processing, prefetching memory data, speculative executions are all examples of this. Technology trends indicate that memory speeds are unlikely to catch up with processor speeds. While current memory designs exhibit limited facilities of pipe lining and hierarchy, we have shown in a co-pending application the design of a scalable pipeline hierarchy which gives a linear latency function at constant bandwidth. The co-pending application, Ser. NO. 09/854,213, IBM Docket YOR920010439US1, is being filed concurrently with the instant application and entitled, "Scalable Memory" and is incorporated herein by reference. However, current day processors cannot exploit such an unbounded pipeline as they tend to remember outstanding memory requests. Since they can have only finite resources, they can exploit the memory pipeline to a very limited extent. The resources include a finite number of buffers to store information about an instruction associated with a tag. For instance, IBM PowerPC processors can have at most 8 to 16 outstanding memory operations and other competing processors have even lower limits. This limit exists because a processor has dedicated resources to remember pending memory requests, and to indicate further processing of the data after it arrives. For example, when a response to an issued memory instruction is returned from the memory of the computer system, the response would include only data retrieved from memory and the memory tag. In order to execute the issued instruction, the tag is used to retrieve the op code and the target address which is stored in buffers the processor. Another source of limitation is the finite number of registers in the processor and the processor's inability to operate on any data that is not present in the registers. In today's processors, instructions can only be executed with operands present in the registers of the processor, so the number of registers imposes a limitation of the number of instructions that can be executed concurrently.

SUMMARY OF THE INVENTION

It is an aspect of this invention to construct a processor that can issue unbounded number of memory requests that can be processed in a pipe-lined manner. This aspect is accomplished by organizing all instructions to manipulate data from memory and packaging memory requests with sufficient information to process the returned data independently. This aspect separates the instruction issue and execution components of a processor, and each of them maintains very minimal state information and operates in an almost "stateless" manner. The minimal state information includes a program counter and a few fence counters.

It is another aspect of this invention to avoid reading data from a memory before a corresponding write to memory, that is to avoid what is known as the read-after-write hazard. This aspect is particularly important when a large number of instructions are issued from the processor, where all of the issued instructions have not been executed, that is when there are a large number of outstanding writes to memory that have not been completed. Such a large number is possible when using the linear memory described in the previously mentioned co-pending application, which is assigned to the same assignee as that of the instant application.

This invention avoids the read-after-write hazard by maintaining a fence counter or counter for each of a number of regions of the memory, where the counter value is used to control the issuance of further instructions from a processor. According to this invention, when a fence instruction designating a particular memory region is issued, no further instructions will be issued if the counter for the particular memory region is above a threshold. The counter for each memory region is incremented each time an instruction, whose target location is in that region, is issued and decremented each time an instruction is executed writing to that memory region. The threshold value is typically set to zero.

DETAILED DESCRIPTION OF THE INVENTION

Figure 1:
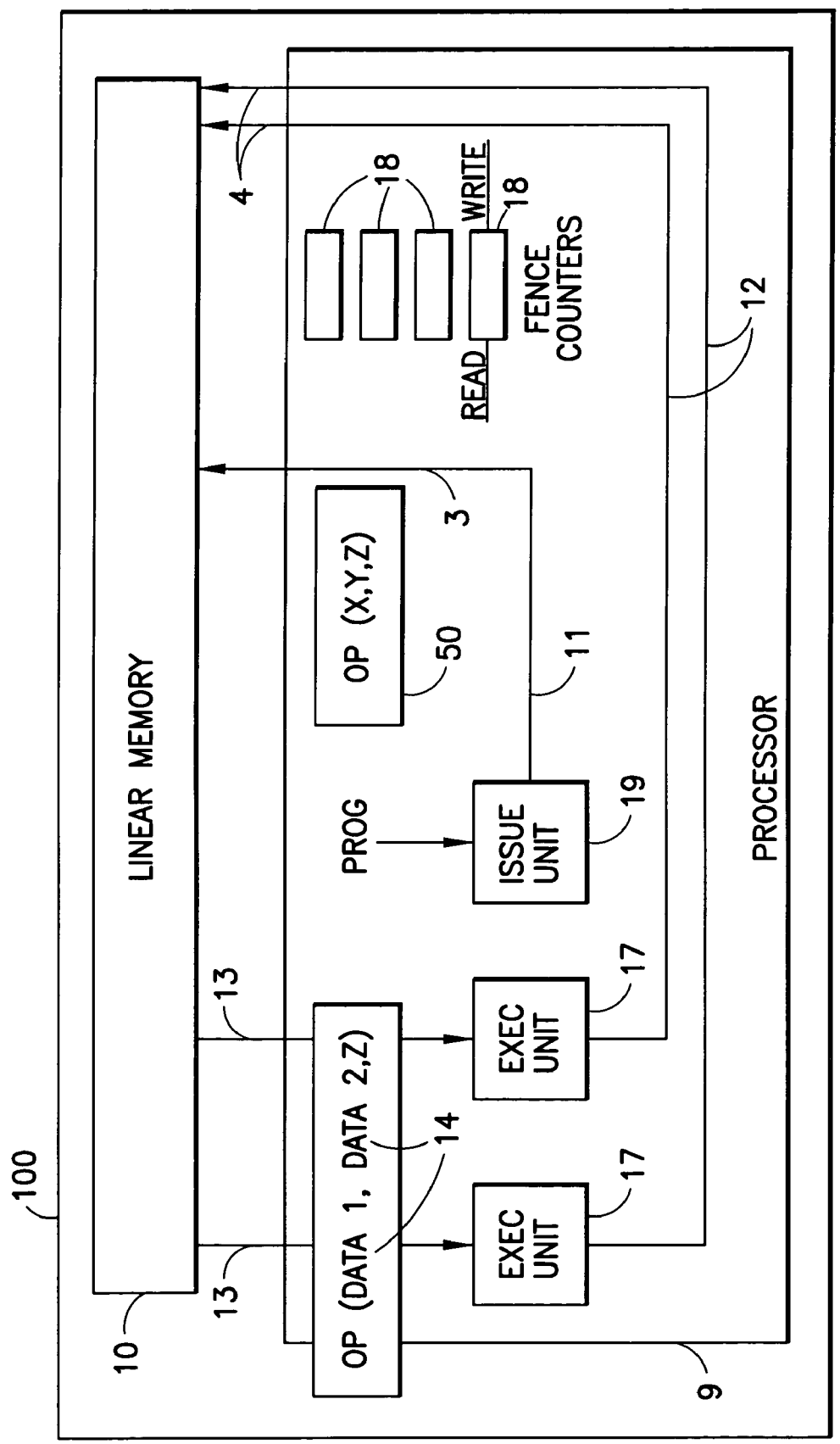
FIG. 1 is a schematic illustration of the scalable processor in accordance with this invention.

FIG. 1 illustrates the general scheme of the scalable processor system 100. It uses the linear memory 16 described in the previously mentioned IBM Docket YOR920010XXX. For convenience, we have extended the memory to have one port 3 for read requests and two ports 4 for write requests. This is done purely to match the linear memory 16 which can deliver two results in each cycle. Two execution units 17 consume these results 14 and submit write requests independently. The organization ensures that requests on these lines 12 do not interfere with each other.

The upward path is divided into three concurrent paths 11–12, one path 11 carrying the read requests to the memory, the other two paths 12 carrying write requests to the memory. This is purely a convenience and does not increase the input bandwidth in any manner.

The read request carries two target addresses x and y. It first travels to the earlier location, collects the data and travels further up on the upward path to the second location and collects the second piece of data. The result travels on the downward path 13 carrying the pair of data items requested. This results a constant increase in the latency on the paths, but does not change the bandwidth considerations in any manner.

Instruction Format:

The processor, will have no registers and uses a linear memory hierarchy for all its data—the lowest level representing registers. The general form of an instruction is op(x,y,z) where x,y,z are addresses of memory locations, and the semantics is to perform the operation (op) on the data from locations x and y and store the result into location z. The second operand may be omitted for unary operations. A unary instruction frequently used is the move(x,z) instruction, which copies the data from location x to location z.

Instruction Issue and Execution:

Referring to FIG. 1, a processor 9 consists of a single issue unit 19 that issues instructions 50 and two execution units 17, each of which can perform any operation when the data is available. Several issue and execution units can be implemented in hardware on a single hardware chip. An instruction goes through two phases: Issue phase and Execution phase. In the Issue phase, a dual-operand fetch is submitted to the linear memory 10. The op code and destination information are attached to the request and returned with the data. The execution phase starts when the memory returns the dual-operand data. Each execution unit receives operand data 14, performs an operation and submits a write request to the memory 10 to store the result. Instructions are issued in the same order in which they are listed in the program. Since the memory does not do any data movement other than what is specified by the instructions, the programs have full control of the memory and do the memory management explicitly by issuing move instructions to bring data closer to the processor as and when they are needed. The pipe lined nature of the memory facilitates concurrent movement of data while executing other instructions. Typically, using this invention, a programmer would use move instructions to bring data closer to the processor by the time the data is needed by the processor.

Figure 2:
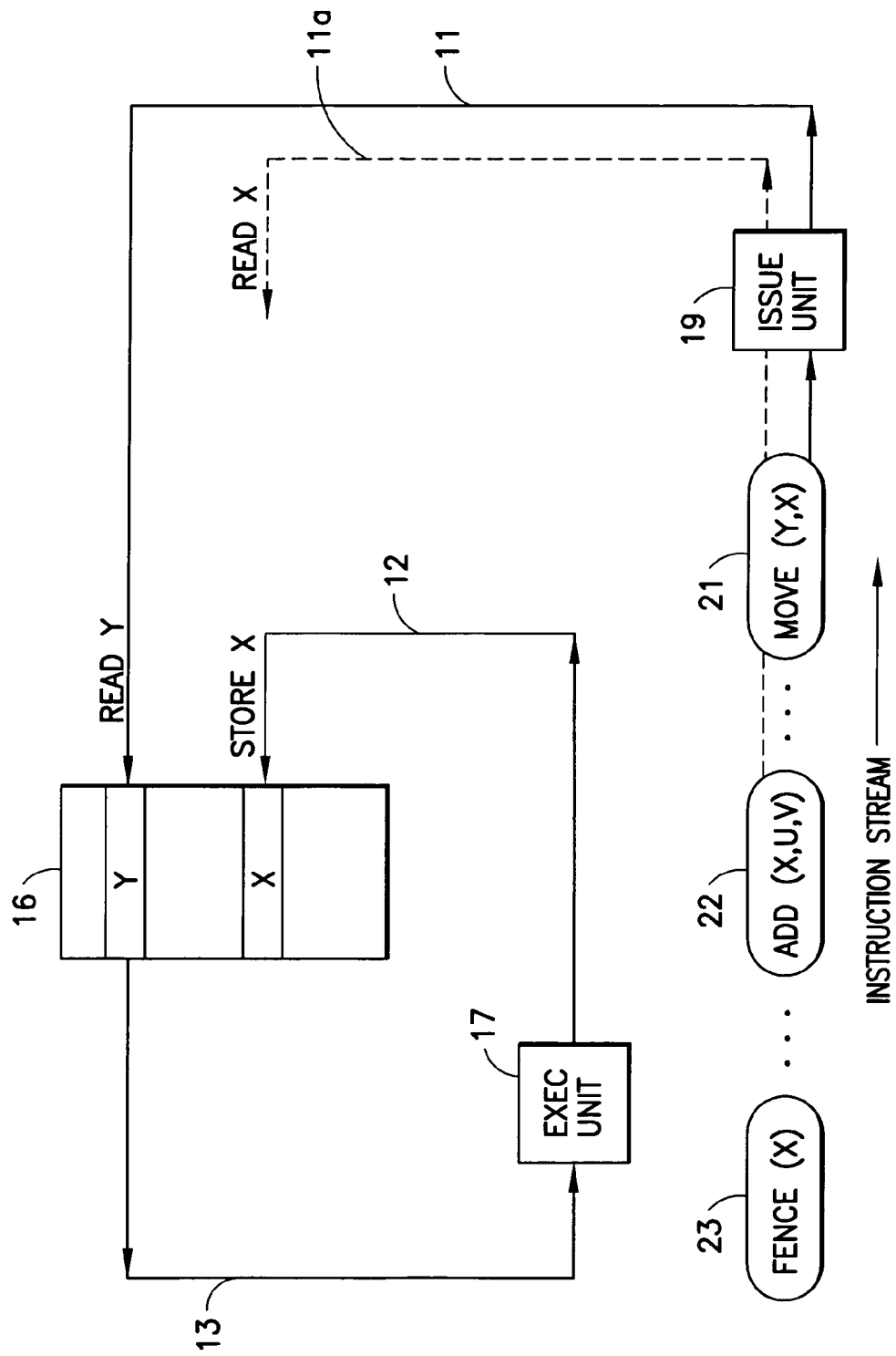
FIG. 2 schematically illustrates the read after write hazard which occurs when a read operation is submitted before a corresponding write operation.

Read-After-Write Hazards:

Since the Issue unit and the Execution units operate concurrently, one must ensure that a write operation to a location is submitted to the memory before a corresponding read operation to that location is submitted. See FIG. 2 for an illustration. For an instruction op(x,y,z), the write request to z is said to be outstanding during the time interval between issuing and executing that instruction. Hazards are avoided by keeping track of outstanding writes to regions of memory as described below. In FIG. 2, the path of solid lines illustrates how the move instruction 21 is executed. When it is issued, location y is read and the data flows into the execution unit 17. When it executes, the result is sent to be stored in location x. However, the issue unit proceeds concurrently and issues other instructions following it. The add instruction 22 is an example of a subsequent instruction that uses x and its path is illustrated by the dashed line 11a. If this add instruction is issued before the previous store to x takes place, we have a hazard.

Figure 3:
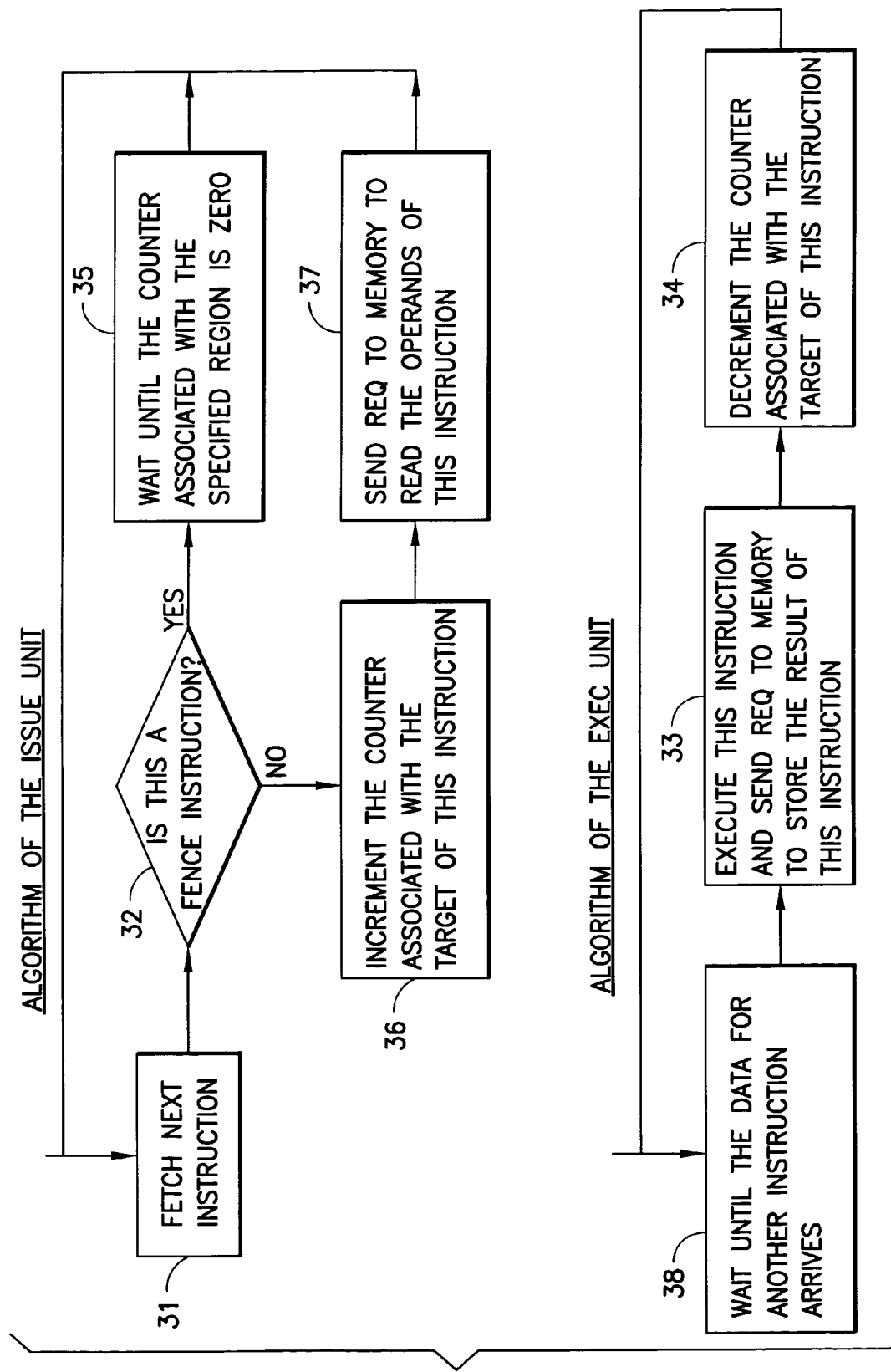
FIG. 3 is a schematic of a linear memory system that could be used with the processor of this invention.

Fence Counter:

The processor is equipped with a finite set of fence counters. Each fence counter is associated with a region of memory. By choosing the sizes of the regions as powers of 2, we need log N, and, thus, maintaining log N counters is not a serious limitation in practice. Referring to FIG. 3, each time an instruction such as op(x,y,z) is issued 31, the fence counter associated, with the range containing z is incremental 36, and a request is sent to memory to read the data at locations, for example, x and y. See 37 of FIG. 3. The data retrieved (data 1, data 2), for example, is then forwarded to the execution unit, as shown in 38 of FIG. 3. When the execution unit completes that operation 33, i.e.. op (data 1, data 2, z), and submits a write request to location z, 33, the corresponding fence counter (See 18 of FIG. 1) is decremented 34. Thus, the fence counter contains the number of outstanding writes to locations in its associated range. Fencing is accomplished explicitly by the program (a la release consistency model) by inserting a special instruction, in the form of: fence (region of memory), where appropriate. See 23 of FIG. 2. When a fence instruction is encountered by the issue unit 32, the issue unit stalls 35 until the corresponding fence counter becomes zero. This mechanism can be used by programs to avoid read-write hazards and can be made efficient by choosing the ranges and placement for the fence operations in a judicious manner. Typically, a counter is implemental in hardware.

The extreme case is to have every operation succeeded by a fence on its target location. While this works correctly, the execution is nearly sequential. A program can be organized to accumulate as many instructions as possible that write into a region and then a fence instruction is posted before accessing any location from that region. Compiler technology can be developed to judiciously choose the positions for fence operations.

Figure 4:
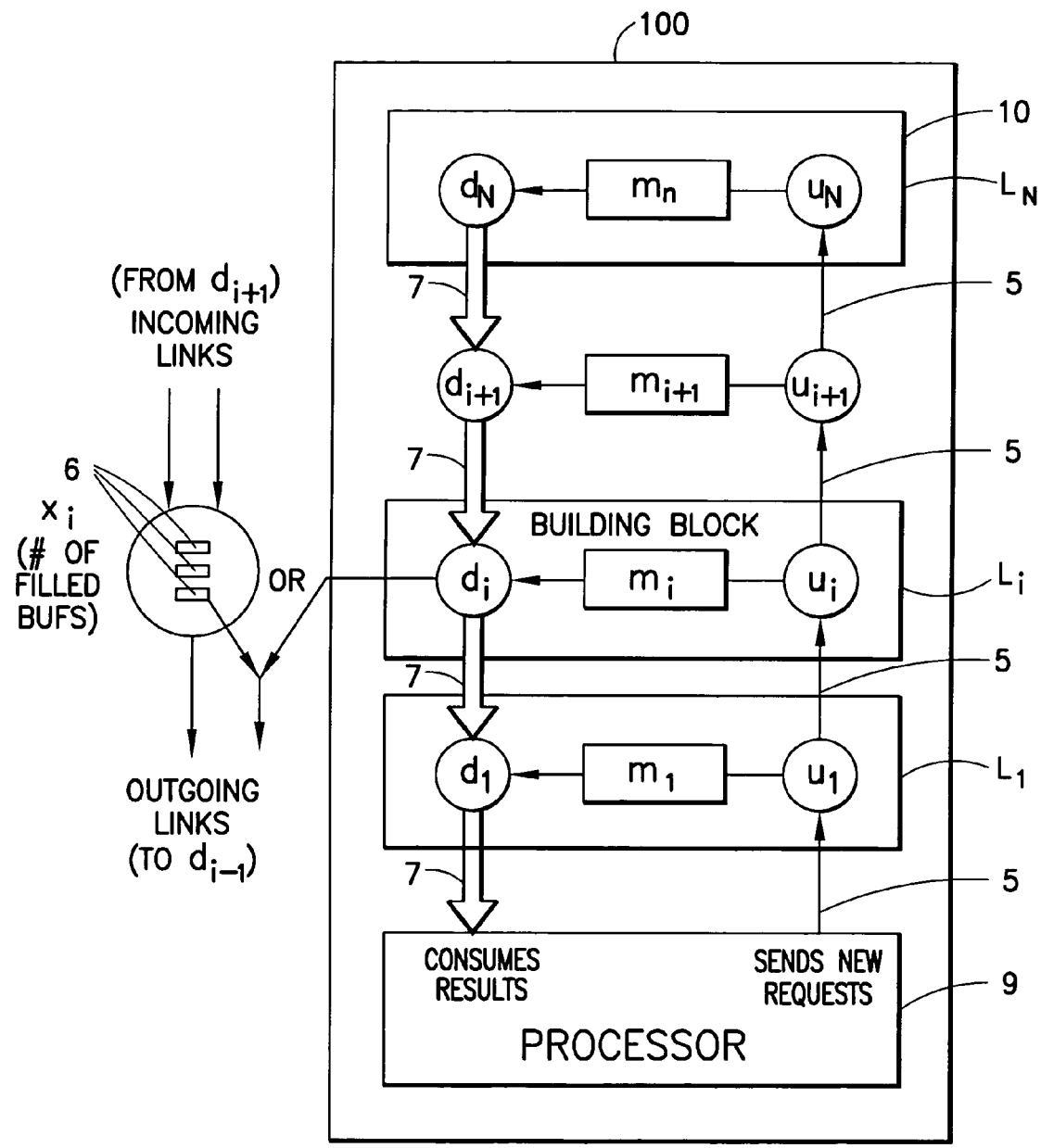
FIG. 4 is a flow chart of the logic used in the controllers for forwarding responses to requests to the processor.

FIG. 4 illustrates the general scheme of the scalable processor system 100. It uses the linear memory 16. For convenience, we have extended the memory to have one port 3 for read requests and two ports 4 for write requests. This is done purely to match the linear memory 10 which can deliver two results in each cycle. Two execution units 17 consume these results 14 and submit write requests independently. The organization ensures that requests on these lines 12 do not interfere with each other.

The read request carries two target addresses x and y. It first travels to the earlier location, collects the data and travels further up on the upward path to the second location and collects the second piece of data. The result travels on the downward path 13 carrying the pair of data items requested.

The structure of the proposed memory system 10 is shown in FIG. 4. For ease of illustration, the system is shown to have a sequence of building blocks laid out in one dimension. The blocks are numbered starting from $L_i$ at the processor and increasing as we go away from the processor. Each i-th building block $L_i$ has unit memory, denoted by $m_i$, and two controllers, $u_i$ and $d_i$. All the controllers $u_i$ are connected by single links 5 forming the "upward path" carrying requests from the processor to the memory cells. The controllers $d_i$ are connected by pairs of links 7 forming the "return path" and carry responses from memory cells to the processor. The design can sustain one request per unit time from the processor on the upward path, but the processor is required to be able to receive up to 2 responses in one unit time along the return path. Thus, this design requires an output bandwidth that is twice that of the input bandwidth. Also shown is a single processor 9 connected to this memory system. A processor such as that described in a related application, which is being filed concurrently with and by the assignee of the instant application, could be used with the memory system of this invention. A memory request specifies a target memory cell address, the operation (read/write) and data if it is a write operation. For a memory of size n, the target address is any integer between 1 and n. Any number greater than n can be used to simulate a no-operation (i.e. the processor did not submit any real request).

Requests and responses also carry additional information that is not interpreted by memory. For instance, if the processor executes an instruction of the form op(x,z) where x,z, are addresses of memory locations, the semantics is to perform the operation (op) on the data from location x of memory and to store the result into location z of memory. For this instruction, the memory request submitted is of the form [read, x, no-data, <op,z>]. The response to this request is of the form [read, x, data, <op,z>] where data is the information that was retrieved from location x. This response is forwarded on the return path through a series of second controllers to the processor. In the sample shown, when the response is received by the processor, the operation is performed on data to obtain a result, say w. Another request is then forwarded from processor through the first controllers on the upward path to store the result w at memory location z. The format of this request may look something like [write, z, w, no-info], which means store the value w at location z.

Figure 5:
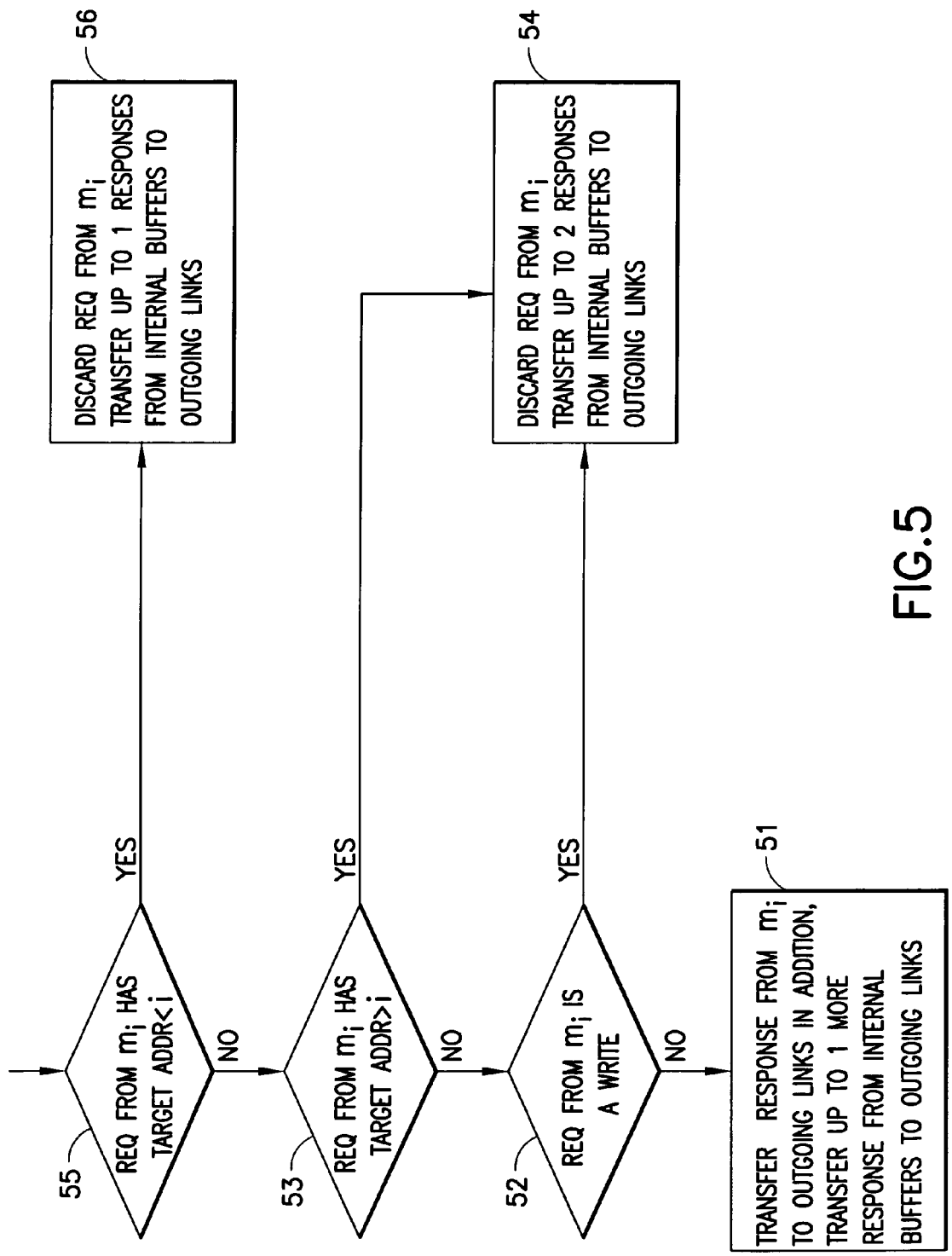
FIG. 5 is a state diagram, where each state indicates the number of responses stored in the buffers of a controller $d_i$

Each request with target address i travels on the upward path and a copy of it reaches the memory unit at every level. The memory unit $m_i$ reads or stores the data depending upon the operation and forwards it to the controller $d_i$. A write operation terminates here without generating any response, whereas a read operation causes the request to be converted into a response which travels along the return path until it reaches the processor. If we assume unit times to travel the communication links and unit time for reading the memory, a read request for target address i takes 2i+1 units of time in the absence of any congestion during its travel. The controllers are designed to deal with congestion and ensure the flow of requests or responses subject to the requirements stated in the preceding section. Referring to FIG. 5, the detailed logic for $u_i$, $m_i$ and $d_i$ are specified below:

Operation in Each Cycle:
See FIG. 4.
For each request received by $u_i$, one copy is sent to m and another copy is sent to $u_{i+1}$. At the top (when i is n) the second copy is simply discarded.
$m_i$ always forwards the request to $d_i$, after copying data from memory into request for a read operation, or copying data from request into memory for a write operation.
As shown in FIG. 4, $d_i$ has three internal buffers 6 which are organized as a FIFO queue. At the beginning of each cycle, $d_i$ transfers any responses to requests present on the 2 links from $d_{i+1}$ into its internal buffers. Then, the following algorithm (See flow chart in FIG. 5) is used to put responses on the two outgoing links to $d_{i+1}$:.
1 If request from m is a read to location i, then it is converted to a response and is placed on the outgoing link. In addition, one response from the internal buffers of $d_i$ (if any) is removed and placed on the outgoing links. (See 51 of FIG. 5.)
2 If request from $m_i$ is a write to location i(52), or the request is targeted to a higher location, then up to two responses from the internal buffers of $d_i$ (if any) are removed and placed on the outgoing links (54).
3 If request from 3 $m_i$ is to a lower location (55), then 1 response from the internal buffers of $d_i$ (if any) is removed and placed on the outgoing links (56).

Figure 6:
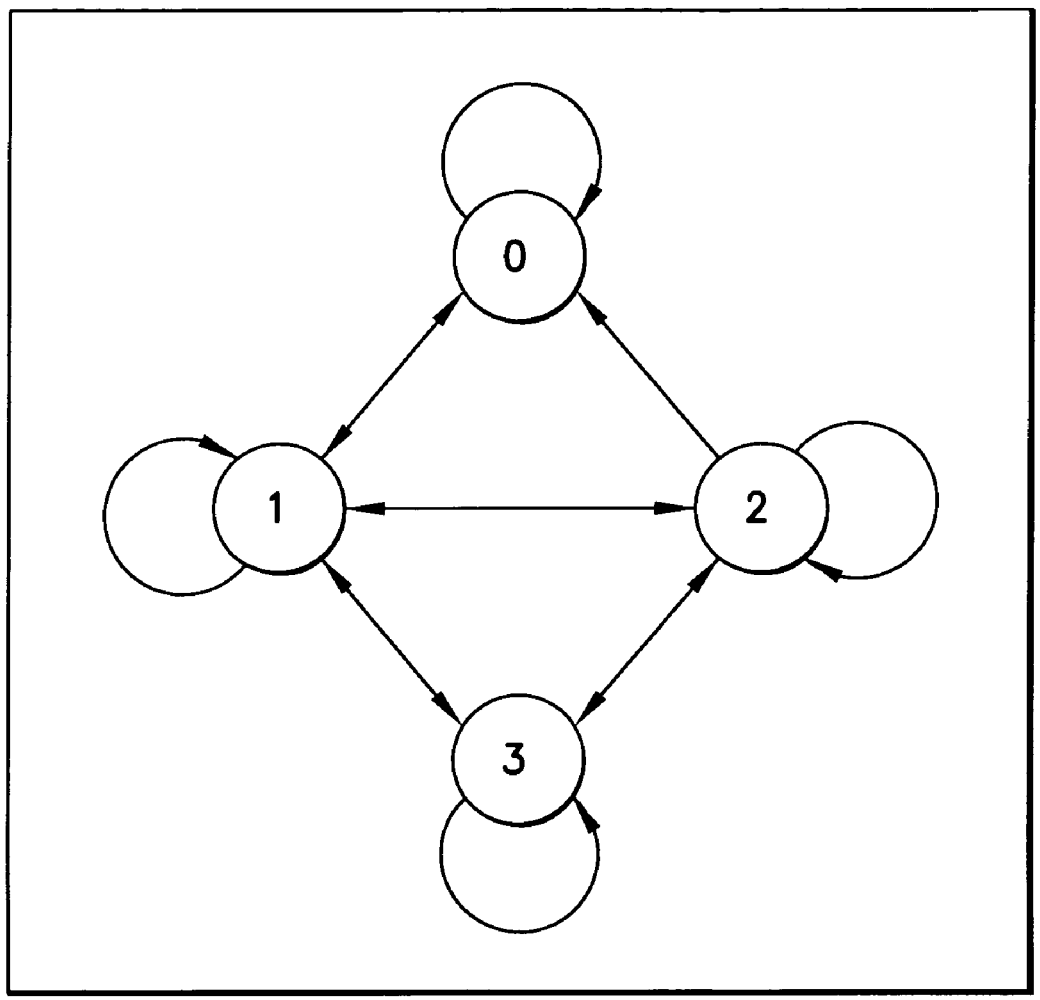
FIG. 6 illustrates the possible transitions for $x_i$.

Properties of the Model:
We now show the two properties required for scalability: constant buffer size in each unit and linear access latency:
The size of the internal buffer of any $d_i$ will never exceed 3. FIG. 6 shows the possible transitions for $x_i$, which is the number of filled buffers in $d_i$ after each cycle. The invariant for the state $x_i=3$ asserts that in that state at most one response can come in through the incoming links and this ensures that $x_i$ will never exceed 3. To show the invariant, we examine the 2 possible transitions into the state $x_i=3$: Consider the first transition to state $x_i=3$. This transition occurs when initially $x_i=2$ and both the two incoming arcs on the link from $d_{i+1}$ (See 7 of FIG. 4.) carry responses and the request to $m_i$ is to location i or lower. This ensures that in the next cycle, there can be at most one response over the incoming arcs from $d_{i+1}$. This is because $m_{i+1}$ will process in the next cycle, a copy of the same response that $m_i$ processed in this cycle and hence $d_{i+1}$ will do case 3 of the above algorithm, outputting only one response. (See 55 and 56 of FIG. 5.) Now consider the second transition to state $x_i=3$. This transition occurs when initially $x_i=3$, there was one incoming request from $d_{i+1}$, and the request to $m_i$ is to location i or lower. This again ensures that in the next cycle, there can be at most one response over the incoming arcs from $d_{i+1}$.

A read request to location i will return a corresponding response to the processor within 4i+1 cycles. The response to the read request reaches $d_i$ after i+1 cycles since its path length is i+1 and there are no delays on these paths. The controller $d_i$ immediately puts it on the outgoing arc as it executes case 1 of the algorithm. According to the algorithm, all buffers are emptied in FIFO order and at least one response from a buffer is removed in every cycle. Consequently, the response from $d_i$ can experience a maximum delay of 3i units before it reaches the processor. Hence the total delay is at most 4i+1 for forwarding a request on the upward path and the corresponding response on the return path to the processor.

We observe that the design preserves the order of memory operations at each location while the order of completion of operations on different locations is unspecified. The proposed memory system can be implemented using standard memory logic which is incorporated into memory chips.

What is claimed is:

1. A method of processing instructions in a computer system, said method comprising:
   determining if the number of outstanding write instructions issued from a processor and targeted to a designated region of memory is above a threshold; and
   issuing a fence instruction designating said region of memory, where no further instructions are issued from said processor until said number of outstanding writes targeted to said designated region fall below said threshold.

2. An apparatus for processing instructions in a computer system, said method comprising;
   an issue unit for determining if the number of outstanding write instructions issued from a processor is above a threshold, and for issuing a fence instruction designating a region of memory, where no further instructions are issued from said processor until said number of writes to said designated region is below said threshold.

3. An apparatus as recited in claim 2, wherein said device is a counter.

4. A system for processing instructions, said system comprising:
   a memory for storing data;
   an issue unit for, in response to each of a number of instructions, retrieving operand data from said memory, and for forwarding, without storing in said memory or in an issue unit, an op code of said each instruction and a target location of said each instruction; and
   an execution unit for executing each of said number of instructions by operating on said data in accordance with said op code and for storing results of said operation on said data at a location in said memory specified by said target location, wherein said target location, said op code and said operand data are received by said execution unit.

5. A method of processing memory instructions in a computer system, said method comprising:
  in response to each of a number of memory instructions:
    retrieving operand data from memory, and forwarding said operand data, an op code, and a target location to an execution unit associated with said system, and executing each instruction by operating on said operand data in accordance with said op code and storing results of said operation on said operand data at a location in said memory specified by said target location; and
  issuing fence instructions designating a region of memory, where no further instructions are issued from the processor until a number of writes to said designated region is below a threshold.

6. A system for processing instructions, said system comprising:
  a memory for storing data;
  an issue unit, in response to each of a number of memory instructions, for retrieving operand data from said memory, an op code of said each memory instruction and a target location of said each memory instruction;
  an execution unit for executing each of said number of memory instructions by operating on said data in accordance with said op code and for storing results of said operation on said data at a location in said memory specified by said target location, wherein said target location, said op code and said operand data are received by said execution unit from said issue unit through said memory; and
  said issue unit also issuing fence instructions for designating regions of memory, wherein for each of said designated regions, no further memory instructions are issued until a number of outstanding writes to said each region is below a corresponding threshold.

7. A method of processing instructions in a computer system, said method comprising:
  when a memory instruction is issued from a processor of said system, incrementing a counter associated with a memory region that contains a memory location specified by a target address of said issued instruction, each memory instruction for reading data form and writing data into a memory;
  when a memory instruction is executed by a processor of said system, decrementing a counter associated with a memory region that contains a memory location specified by a target address of said executed instruction; and
  issuing a fence instruction designating a region of memory, where no further instructions are issued until said counter associated with said designated region is below a threshold.

8. An apparatus for processing instructions in a computer system, said apparatus comprising:
  counter means for, when a memory instruction is issued from a processor of said system, incrementing a counter associated with a memory region that contains a memory location specified by a target address of said issued memory instruction, each memory instruction for reading data from and writing data into a memory; and for, when a memory instruction is executed by a processor of said system, decrementing a counter associated with a memory region that contains a memory location specified by a target address of said executed instruction; and
  instruction means for issuing a fence instruction, where no further instructions are issued until said counter associated with said designated region is below a threshold.

9. A method of processing instructions in a computer system, said method comprising:
  when a memory instruction is issued from a processor of said system, incrementing a counter associated with a memory region that contains a memory location specified by a target address of said issued instruction, each instruction for reading data from and writing data into a memory;
  when a memory instruction is executed by a processor of said system, decrementing a counter associated with a memory region that contains a memory location specified by a target address of said executed instruction, wherein each issued instruction includes data retrieved from said memory, an op code and target location; and
  issuing a fence instruction designating a region of memory, where no further instructions are issued until said counter associated with said designated region is below a threshold.

10. An apparatus for processing instructions in a computer system, said apparatus comprising;
  counter means for, when a memory instruction is issued from a processor of said system, incrementing a counter associated with a memory region that contains a memory location specified by a target address of said issued instruction, each instruction for reading data from and writing data into a memory; and when an instruction is executed by a processor of said system, decrementing said counter associated with a memory region that contains a memory location specified by a target address of said executed instruction, wherein each issued instruction includes data retrieved from said memory, an op code and target location, so that each issued instruction can be executed independently of any information not included in each issued instruction; and
  instruction means for issuing a fence instruction designating a region of memory, where no further instructions are issued until said counter associated with said designated region is below a threshold.

* * * * *